US008645227B2

(12) United States Patent
Owen

(10) Patent No.: US 8,645,227 B2
(45) Date of Patent: Feb. 4, 2014

(54) SYSTEMS AND METHODS TO FACILITATE PAYMENT OF SHIPPED GOODS

(75) Inventor: Dave Owen, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 1333 days.

(21) Appl. No.: 12/023,507

(22) Filed: Jan. 31, 2008

(65) Prior Publication Data

US 2009/0198586 A1 Aug. 6, 2009

(51) Int. Cl.
G06Q 30/00 (2012.01)
G06Q 99/00 (2006.01)
G06Q 30/06 (2012.01)
G06Q 20/40 (2012.01)
G06Q 30/04 (2012.01)
G06Q 10/08 (2012.01)

(52) U.S. Cl.
CPC ...... *G06Q 30/0619* (2013.01); *G06Q 20/40145* (2013.01); *G06Q 30/0617* (2013.01); *G06Q 30/04* (2013.01); *G06Q 10/083* (2013.01)
USPC .......... 705/26.44; 705/26.43; 705/67; 705/76

(58) Field of Classification Search
USPC .......... 705/26, 26.1, 64, 65, 26.44, 26.43, 67, 705/76
See application file for complete search history.

(56) References Cited

U.S. PATENT DOCUMENTS

| | | | | |
|---|---|---|---|---|
| 4,179,686 | A * | 12/1979 | Bonicalzi et al. | 382/115 |
| 5,963,925 | A * | 10/1999 | Kolling et al. | 705/40 |
| 7,280,984 | B2 | 10/2007 | Phelan, III et al. | |
| 7,657,738 | B2 * | 2/2010 | Canard et al. | 713/156 |
| 2001/0056410 | A1 * | 12/2001 | Ishigaki | 705/67 |
| 2002/0040350 | A1 * | 4/2002 | Shinzaki | 705/74 |
| 2002/0087461 | A1 * | 7/2002 | Ganesan et al. | 705/39 |
| 2005/0119956 | A1 * | 6/2005 | Soumokil | 705/34 |
| 2005/0177447 | A1 | 8/2005 | Napier et al. | |
| 2006/0122899 | A1 * | 6/2006 | Lee et al. | 705/26 |
| 2006/0286969 | A1 * | 12/2006 | Talmor et al. | 455/415 |
| 2007/0078797 | A1 * | 4/2007 | Won et al. | 705/408 |
| 2007/0233611 | A1 * | 10/2007 | Boyd et al. | 705/65 |
| 2008/0162304 | A1 * | 7/2008 | Ourega | 705/27 |
| 2009/0006205 | A1 | 1/2009 | Bixler et al. | |
| 2009/0006250 | A1 | 1/2009 | Bixler et al. | |
| 2009/0089209 | A1 | 4/2009 | Bixler et al. | |

OTHER PUBLICATIONS

Gerson, Vicki, "Pen-input Unit Enables Signature Capture," Bank Systems & Technology 36.6 (Jun. 1999).*
Woehr, Maria, "RSA Secures Transactions," Insurance & Technology 31.7, Jul. 2006.*

* cited by examiner

*Primary Examiner* — Amee A Shah
(74) *Attorney, Agent, or Firm* — Kilpatrick Townsend & Stockton, LLP

(57) ABSTRACT

One method herein includes forwarding an invoice for a purchase agreement made between a seller and a buyer. The method includes receiving a service selection indicating that the invoice is to be paid using an escrow system. The service selection includes a token for verification of a buyer's signatory. The method receives funding confirmation that the buyer has deposited funds into an escrow account. Based on funding confirmation, notification to ship the goods is sent. The method receives shipping confirmation confirming that the goods have been shipped. Upon receipt of the goods, a receiver is authenticated as the authorized signatory using the verification system. This authentication is based on the stored token matching a provided token. Based on verification of the receiver, the goods are released and the deposited funds from the escrow account are deposited into the seller's account.

12 Claims, 5 Drawing Sheets

SYSTEMS AND METHODS TO FACILITATE PAYMENT OF SHIPPED GOODS

FIELD OF THE INVENTION

The present invention relates, in general, to payment of shipped goods, and more particularly, to payment of shipped goods using a verification system.

BACKGROUND

Presently, the verification process of received goods in order to authorize the release of funds from escrow accounts is inefficiently, ineffectively, and haphazardly done. Typically, a seller will check an escrow account to determine if a buyer has placed the appropriate funds into the account. If the funds are present, the seller will then ship the goods to the buyer. A shipping company has someone at the buyer's company sign for the goods and the goods are released to the buyer. The buyer checks a tracking system for the goods and releases the funds in the escrow account to the seller.

One shortcoming with this approach is the lack of verification of the receiving party for the buyer. Often the person signing for the shipped goods is a receptionist or security guard who is likely to have little or no knowledge of the goods. As such, the goods can often be lost or misplaced. This can cause delays in payment to the seller, incorrect failed shipping claims against sellers, fraud by the buyer or seller, etc. Essentially current systems and methods fail to properly verify with acceptable certainty that goods have been successfully received by the buyer. Hence, there is a need for improved methods and systems in the art.

BRIEF SUMMARY

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

An exemplary computerized method of facilitating payment of shipped goods is described. The method may include forwarding, to a buyer, an invoice for a purchase agreement made between a seller and the buyer. The method may further include receiving, from the buyer, a service selection indicating that the invoice is to be paid using an escrow verification system. In one embodiment, the service selection may include a token used to verify an authorized signatory for the buyer. The token may then be stored in a storage medium.

The method may further receive a funding confirmation that the buyer has deposited funds into an escrow account for the invoice amount, and based on the funding confirmation, notify the seller to proceed with shipping goods associated with the invoice. The method may then receive, from the seller, a shipping confirmation to confirm that the goods have been shipped, and upon receipt of the goods, authenticate a receiver as the authorized signatory for the buyer using the verification system to verify the receiver's identity. This authentication may be based at least in part on the stored token matching a provided token. Hence, based on verification of the receiver, the goods may be released and the deposited funds from the escrow account may be deposited into the seller's account.

An exemplary embodiment of a system for facilitating payment of shipped goods is described. The system may include a input device configured to receive input from a receiver. The input may be used to verify the receiver as an authorized signatory for a buyer. The system may further include a token storage database configured to store verification tokens and an escrow verification system.

In one embodiment, the escrow verification system may be coupled with the input device and the token storage database. The escrow verification system may be configured to receive a token from the buyer used to verify an authorized signatory for the buyer. The escrow verification system may also be configured to transmit the token to the token storage database to be stored. The escrow verification system may further receive a funding confirmation that the buyer has deposited funds into an escrow account and then notify a seller to proceed with shipping goods. Furthermore, the escrow verification system may authenticate the receiver as the authorized signatory for the buyer based on the input received from the input device. Then, based on verification of the receiver, the escrow verification system may release the goods and transfer the deposited funds from the escrow account to the seller's account.

Another exemplary embodiment of a machine-readable medium for facilitating payment of shipped goods is described. The machine-readable medium may include forwarding, to a buyer, an invoice for a purchase agreement made between a seller and the buyer. The machine-readable medium may further include receiving, from the buyer, a service selection indicating that the invoice is to be paid using an escrow verification system. In one embodiment, the service selection may include a token used to verify an authorized signatory for the buyer. The token may then be stored in a storage medium.

The machine-readable medium may further receive a funding confirmation that the buyer has deposited funds into an escrow account for the invoice amount and, based on the funding confirmation, notify the seller to proceed with shipping goods associated with the invoice. The machine-readable medium may then receive, from the seller, a shipping confirmation to confirm that the goods have been shipped and, upon receipt of the goods, authenticate a receiver as the authorized signatory for the buyer using the verification system to verify the receiver's identity. This authentication may be based at least in part on the stored token matching a provided token. Hence, based on verification of the receiver, the goods may be released and the deposited funds from the escrow account may be deposited into the seller's account.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to facilitating the shipping of goods. An important part of the shipping process is the negotiation of payment and the payment process. In most situations the buyer does not want to pay for goods until they have been received and the seller does not want to ship the goods until they have received payment. As such, an objective third-party entity may be needed in order to act as an intermediary between the buyer and the seller.

In such a situation, the third-party entity may be required to accept liability for problems associated with the shipping and the payment of the goods. For example, the third-party entity may need to be as certain as possible that the goods have been delivered and accepted by an authorized representative of the buyer before releasing funds to the seller. In such a situation, the third-party entity should implement a system which is configured to verify the identity of the individual receiving the goods as an authorized agent for the buyer in order to ensure proper shipment of the goods.

Figure 1:
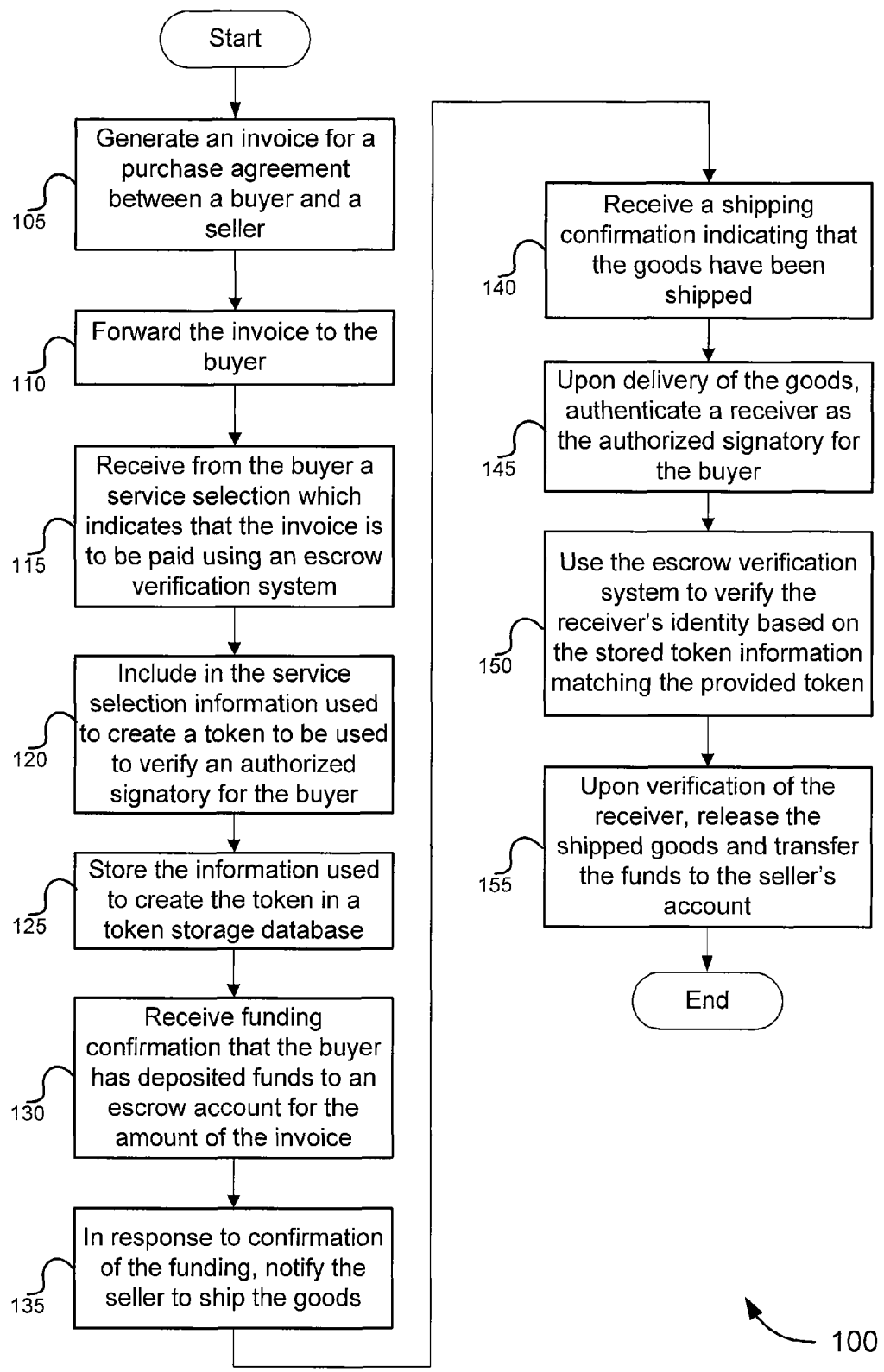
FIG. 1 is a flow diagram illustrating a method of facilitating the shipment of goods, in accordance with various embodiments of the invention.

Turning now to FIG. 1 which illustrates one embodiment of a method 100 of facilitating the shipment of goods. At process block 105, an invoice (or other equivalent financial document) may be generated based on a purchase and/or payment agreement between a buyer and a seller. In one embodiment, the invoice may be an electronic invoice (e-voice) as described in U.S. patent application Ser. No. 11/864,467, filed on Sep. 28, 2007, entitled METHODS AND SYSTEMS FOR GENERATING INVOICES, which is incorporated by reference in its entirety for any purpose. The invoice may detail various aspects of the sales agreement between the buyer and the seller, which may include for example, pricing of the goods, shipping costs, insurance costs and insurance providers, deadline information, etc. Accordingly, the invoice may be used by both the buyer and the seller to represent any aspect of the sales agreement.

At process block 110, the invoice (or e-voice) may be forwarded to the buyer. Additionally, the e-voice may also be forwarded to the seller. In one embodiment, the buyer and/or the seller may have subscribed to a financial transaction service such as Western Union's™ Global Business Payments™ account services described at least in U.S. Provisional Patent Application No. 60/946,341, filed on Jun. 26, 2007, entitled CONSOLIDATED PAYMENT OPTIONS, and U.S. Provisional Patent Application No. 60/946,344, filed Jun. 26, 2007, entitled METHODS AND SYSTEMS FOR TRACKING AND REPORTING FINANCIAL TRANSACTIONS, which are each incorporated by reference in their entirety for any purpose.

In a further embodiment, the buyer may transmit a service selection request associated with the invoice to an escrow verification service (process block 115). In one embodiment, the service selection request may include an indication that the invoice is to be handled using the services of the escrow verification service, meaning for example, that the escrow service is to handle each of the transactions associated with shipping and payment of the invoice.

At process block 120, the buyer may include in the service selection request information used to create a token to be used to verify a set of employees and/or individuals associated with the buyer that are able to act as agents and/or signatories on behalf of the buyer. These agents may then be identified through the escrow verification service as the only individuals at the buyer's company that can effectively accept the shipment of goods. In one embodiment, the authorized signatories ensure that shipped goods are properly received for the buyer, that the correct goods are received, that the quality of the goods is acceptable, etc. The authorized signatories further enable the escrow service to confidently provide verification that the buyer has actually received the goods. Furthermore, in the service selection request, the buyer may be required to agree that, upon confirmation of receipt of goods by a verified signatory provided by the buyer, the buyer agrees to release the escrow service of any liability associated with the shipment of the goods and/or payment of the goods.

In one embodiment, the information provided to create the token may be a digital signature of authorized signatories for the buyer. The signatures can be matched in order to verify the identity of the signatories. In an alternate embodiment, the information may be a login and password which may be used by a signatory to login to a website from the escrow service to demonstrate to the shipping company that they are indeed authorized signatories. Upon successfully logging in to the site, a verification report may be printed out and handed to the delivery person, or an email, text message, fax, etc. may be sent to the shipping company indicating verification of the signatory.

In an alternative embodiment, the information for creating a token may simply be the signatory's name, social security number, date of birth, or other identifying information used to generate an identification card to act as the token. In one embodiment, the identification card may include a magnetic stripe, an RF chip, a smart chip, etc., to store information used to verify the identity of the signatory set to receive the goods. Alternatively, the identification card may simply include the signatory's photograph for visual identification by the delivery person. In one embodiment, the signatory may be required to present the identification card issued from the escrow service as well as another form of identification (e.g., driver's license, military ID, a government ID, a passport, etc.).

In a further embodiment, the information used to create the token may be a variety of biometric markers used to verify the identity of the signatory. For example, the signatory's fingerprints, retinal scan data, etc. may be transmitted to the escrow verification service. The biometric markers may then be scanned by the delivery person to verify the identity of the signatory.

In yet another embodiment, the information for creating the tokens may be an indication that the buyer may need a certain number of token devices. As such, the buyer would then be responsible for the security and location of the token devices. In one embodiment, the token devices may be random number generator secure identification (ID) devices. For example, RSA's SecureID™ device which randomly generates a verification number in a small device after a certain amount of time (e.g., every 60 seconds). The randomly generated number retrieved from the device may then be input into a computing device (e.g., a personal computer, a mobile device, a smart phone, a personal digital assistant (PDA), a cellular phone, a portable computer, a laptop, etc.) along with a username and password, in order to verify the identity of the signatory. Alternatively, the token device may be scanned by the delivery person and, upon a successful scan and the signatory being in possession of the token, the signatory may be verified as an authorized signatory.

Additional verification tokens and/or procedures may be used, for example, the buyer may have a signatory call into a call center for the escrow service in order to receive a verification number to present to the delivery person. Nonetheless, it may be important to note that the token is used in order to effectively indicate to the escrow service via the delivery service provider that the individual receiving the shipped goods is in fact an authorized signatory of the buyer. In one embodiment, the buyer may be responsible for updating the list of authorized signatories with the escrow verification service. For example, when a signatory leaves the company, the buyer may need to remove the signatory no longer employed at the company and replace them with a new signatory. In one embodiment, the buyer may be responsible for any unauthorized activity by an authorized signatory which the buyer fails to remove from the list maintained with the escrow service.

At process block 125, the information used to create the token may be stored in, for example, a token storage database. In one embodiment, the token database may include all of the necessary information to identify and associate an authorized signatory with the token and/or token information. The database may then be accessed in order to retrieve the necessary information during the verification process.

At process block 130, the escrow service may receive funding confirmation that the buyer has deposited the funds associated with the invoice into an escrow account. In one embodiment, the funding confirmation may be electronically transmitted to the escrow service, as well as to the buyer and/or seller. In response to receiving the funding confirmation, the escrow service may then notify the seller that it is now acceptable to ship the goods to the buyer (process block 135).

In one embodiment, the escrow verification service may have a shipping company or multiple shipping companies that are designated as official shipping companies. As such, the escrow service may mandate that the seller use these designated shipping companies. This may be necessary in order to ensure that the delivery person for the shipping company has all of the proper equipment (i.e., scanning equipment, portable computing devices, etc.), and is aware of the proper signatory verification process in place for the escrow service.

At process block 140, a shipping confirmation indicating that the goods have been shipped may be received by the escrow verification service. The shipping confirmation may be automatically generated by the shipping company or alternatively the seller may notify the service after the goods have been deposited with the shipping company. Nonetheless, upon delivery of the goods at the buyer's designated location, the receiving individual for the buyer is authenticated in order to verify that the receiver is an authorized signatory for the buyer (process block 145). In one embodiment, the verification process may be implemented using any of the token verification processes described above. For example, the delivery person, before releasing the goods to the receiver, will determine if the receiver is an authorized signatory based on verification of the token. Furthermore, the delivery person may not be authorized to release the goods, unless proper verification occurs.

In one embodiment, the receiver's identity may be based on their token and/or identification information matching the stored token and/or identification information stored in the token storage database (process block 150). Accordingly, if the tokens and information match, the receiver is verified as an authorized signatory of the buyer, and the goods may then be released to the signatory and the funds in the escrow account may be transferred to the seller (process block 155). Thus, the buyer has received the goods, the escrow is assured that the buyer has received the goods, and the seller receives the funds to pay for the goods. All three entities have verification and confirmation associated with the transaction.

Figure 2:
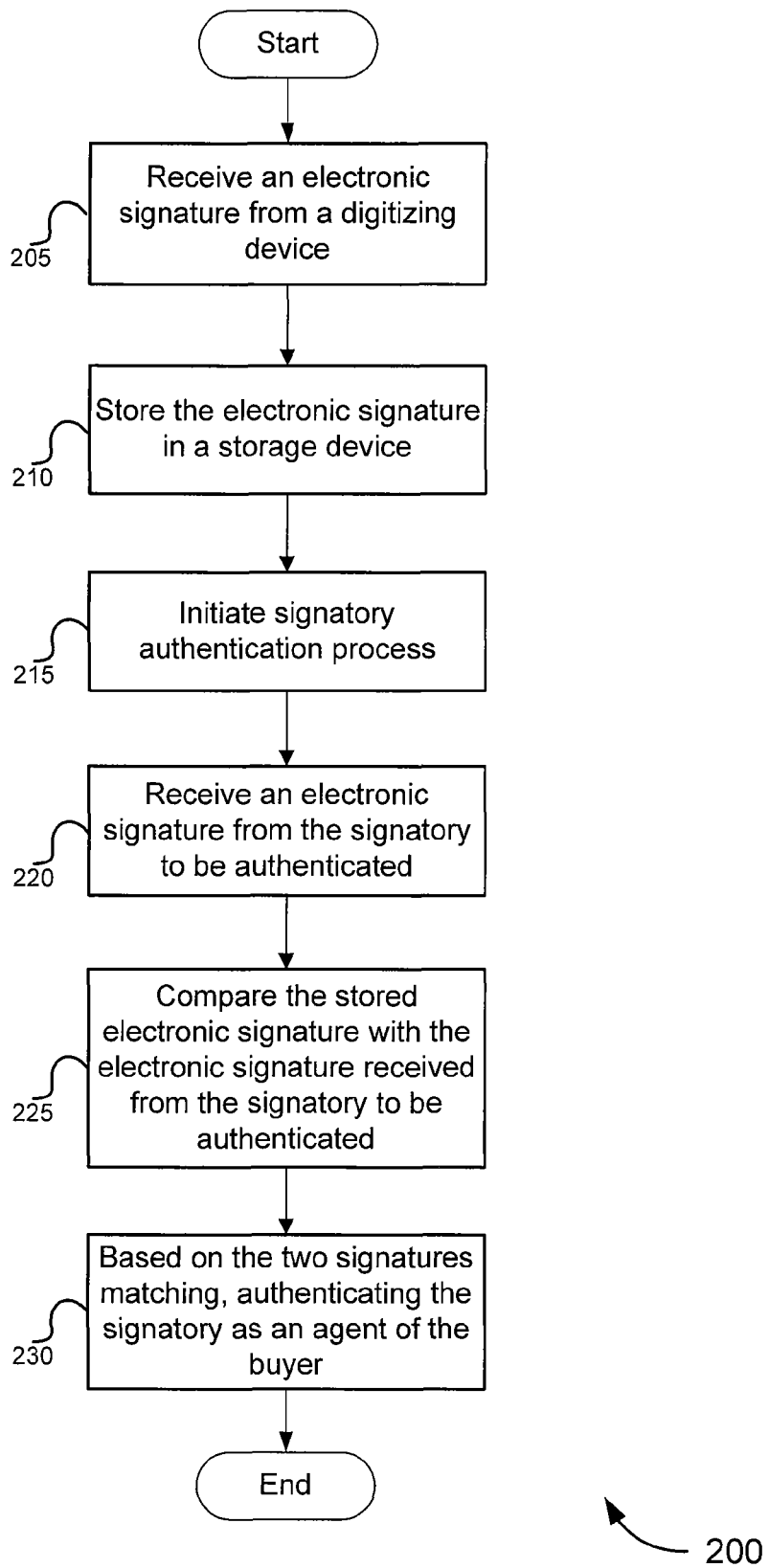
FIG. 2 is a flow diagram illustrating a method of verifying a buyer's signatory, in accordance with various embodiments of the invention.

Now describing FIG. 2 which illustrates one embodiment of a method 200 of verifying a buyer's signatory. At process block 205, an electronic signature from a digitizing (or equivalent) device may be received by the escrow verification service from the buyer. The electronic signature is used to designate an authorized signatory for the buyer. At process block 210, the escrow service may store the electronic signature in a storage database. In one embodiment, the storage database may be configured to be accessed during the verification process of the signatory.

At process block 215, after the goods associated with the invoice have been delivered to the buyer's location, the signatory authentication process may be initiated. At process block 220, an electronic signature from the receiver for the buyer may be received. In one embodiment, the receiver may enter the electronic signature into a handheld digitizing device presented by the delivery person; however, the electronic signature may be entered in other ways.

At process block 225, the signature entered by the receiving individual is compared with the signature stored by the escrow service in the storage device. If the two signatures match, the receiver is authenticated as an authorized signatory of the buyer (process block 230). However, if the signatures do not match, the receiver is not authorized and the goods will not be released by the delivery person. The authentication example described in FIG. 2 may be modified to authenticate a signatory using the various other authentication methods described above.

In a further embodiment, receiver may be given a set number of retries during the authentication process (e.g., three attempts). After the receiver fails to authenticate the set number of times, the receiver may be locked from the authentication process. Subsequently, the receiver may be required to obtain special permission from the escrow service to unlock their account. Furthermore, the escrow service may be alerted to any failed authentication attempts.

Figure 3:
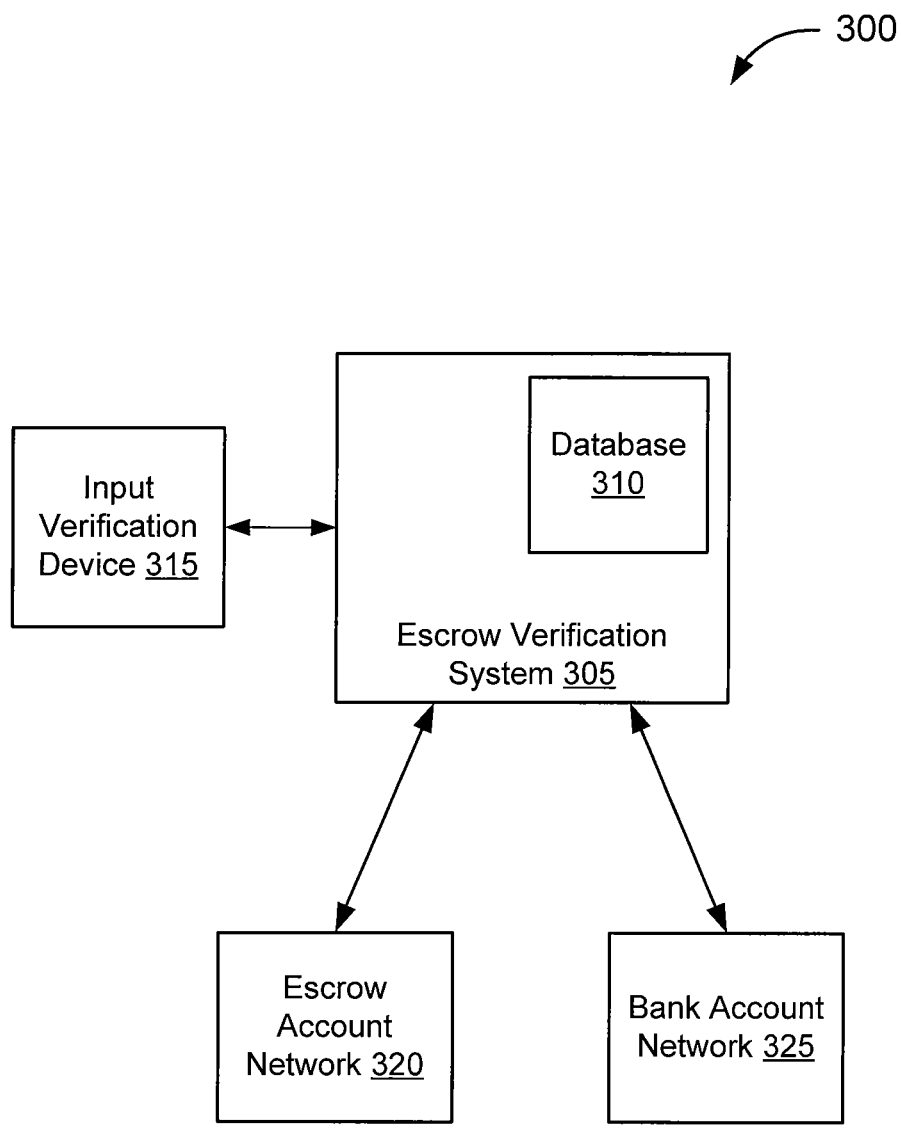
FIG. 3 is a block diagram illustrating a system for facilitating the shipment of goods, in accordance with various embodiments of the invention.

Now describing FIG. 3 which illustrates one embodiment of a system 300 for facilitating the shipment of goods. In one embodiment, system 300 may include an escrow verification system 305. Escrow verification system 305 may include a database 310. In one embodiment, escrow verification system 305 may implement the escrow verification service described above in FIGS. 1 and 2. Furthermore, database 310 may be the token storage database (FIG. 1) and/or the storage device (FIG. 2) described above.

In a further embodiment, system 300 may include an input verification device 315, and escrow account network 320 and a bank account network 325 each connected with escrow verification system 305. In one embodiment, escrow verification system 305 may be configured to receive verification input from input verification device 315 used to verify the identity of a signatory for the buyer. The input verification device 315 may be, for example, a signature digitizing device, a computing device configured to accept a login, a scanning device used to verify various identification tokens, a biometric scanner, etc. Consequently, input verification device 315 may be any device used to implement the various verification token configurations described above with response to FIG. 1.

In a further embodiment, database 310 may be accessed by escrow verification system 305 during verification of a signatory to retrieve token information that may be needed to perform the verification process. Furthermore, escrow account network 320 may be connected to escrow verification system 305 in order to receive escrow funds from the buyer upon confirmation of shipment of the goods, and to transfer the funds to banking account network 325 upon release of the goods to the buyer. In other words, system 300 may be configured to implement the signatory verification process described above in FIGS. 1 and 2.

Figure 4:
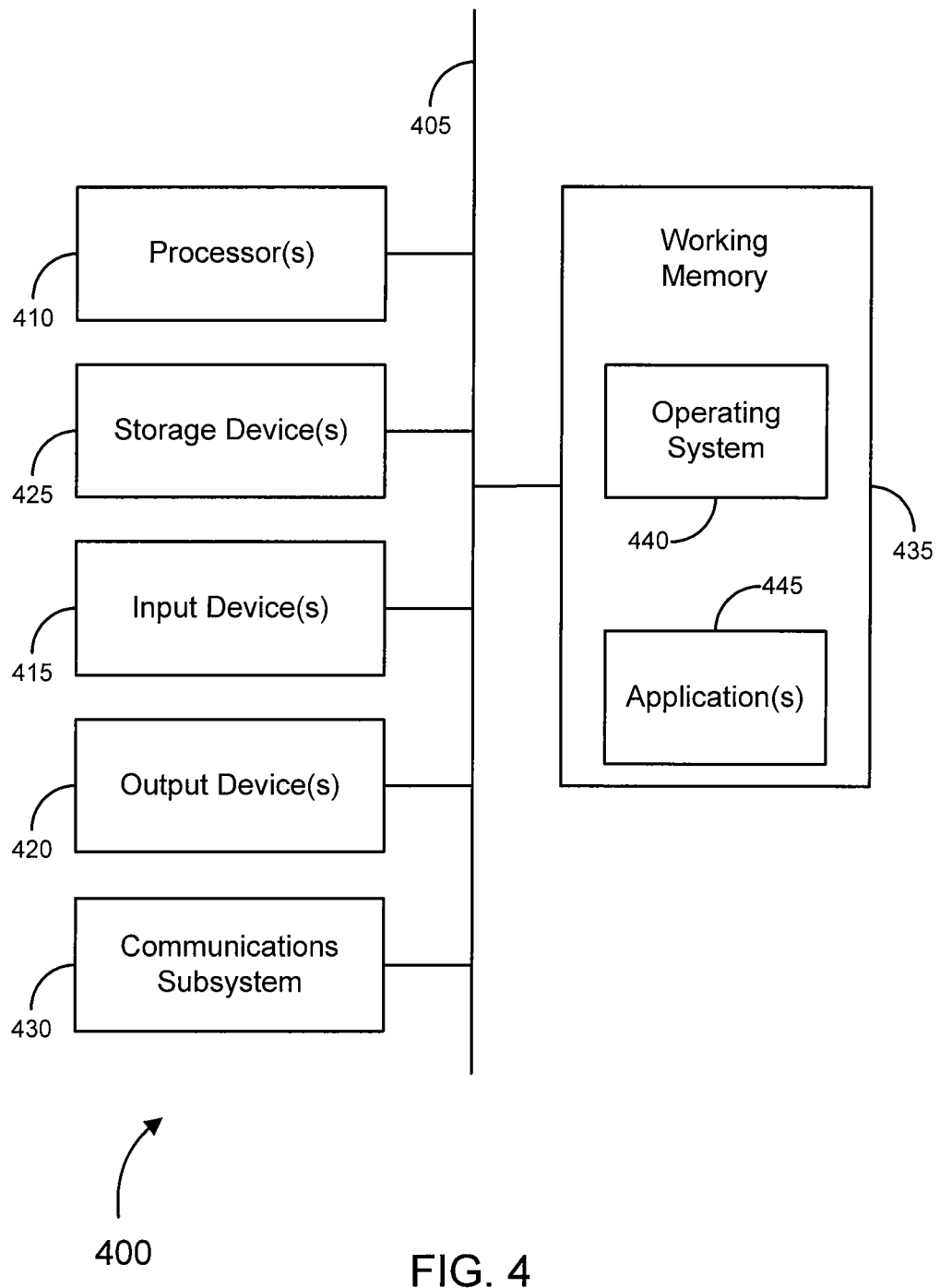
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function as, for example, escrow verification system 305 from FIG. 3. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation, dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
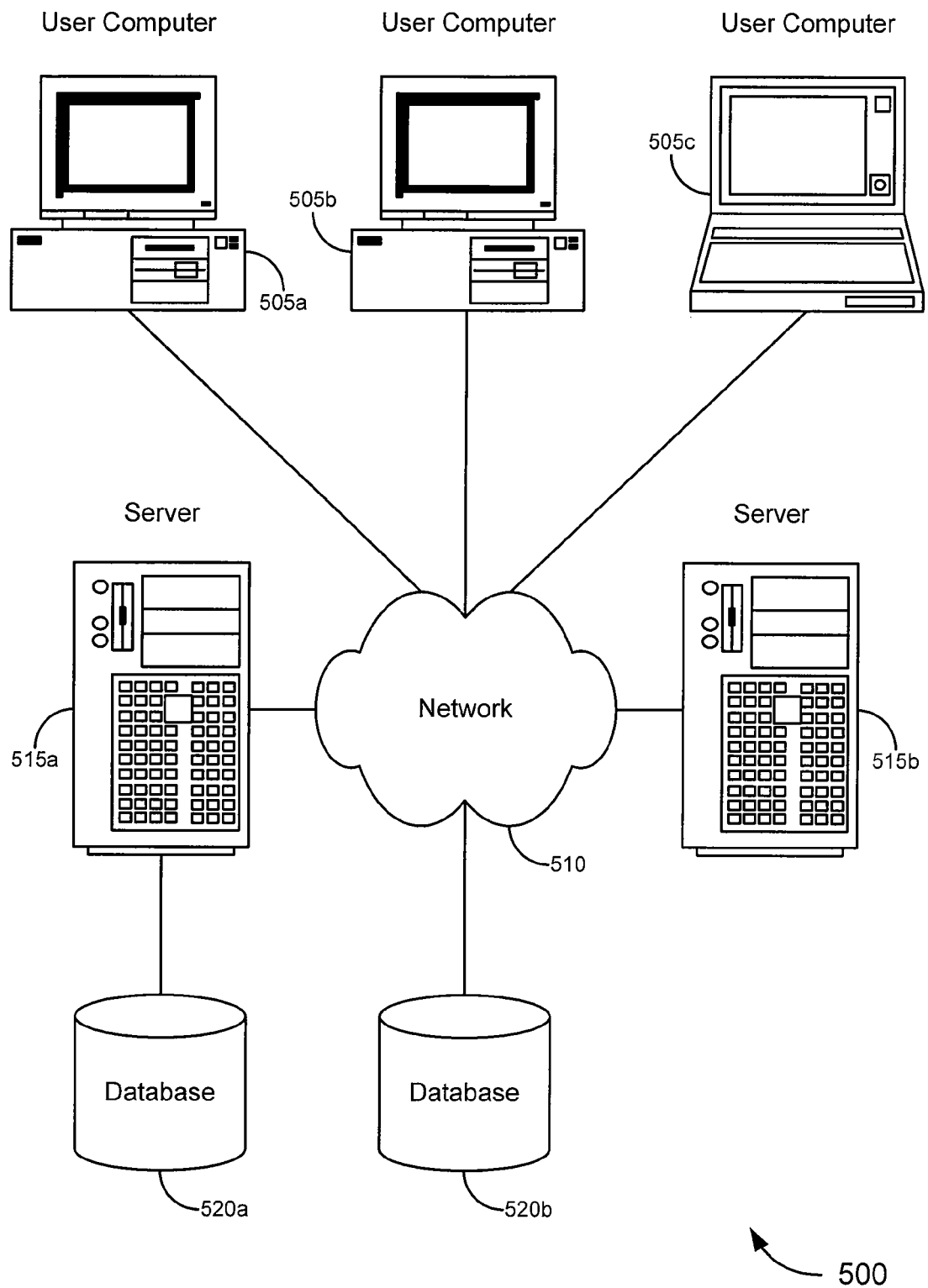
FIG. 5 is a block diagram illustrating a networked system of computers, which can be used in accordance with various embodiments of the invention.

A set of embodiments comprises systems for facilitating the shipment of goods. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant (PDA), capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 505 to perform methods of the invention.

The server computers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 505 and/or another server 515. In some embodiments, an application server can create web pages dynamically for displaying the information in accordance with embodiments of the invention, such as the web interface for the signatory for the buyer logging in to verify their status as an agent for the buyer. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as the database can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computerized method of facilitating payment of shipped goods, the method comprising:
    initiating, at an escrow verification system, an invoicing interface, wherein the invoicing interface is configured to provide a centralized view of a plurality of invoices for a seller;
    forwarding, to a buyer from the escrow verification system, an invoice from the plurality of invoices for a purchase agreement made between the seller and the buyer;
    receiving, from the buyer, a service selection indicating that the invoice is to be paid using the escrow verification system;
    receiving, with the escrow verification system, a first electronic signature input from a digitizing device;
    storing, with the escrow verification system, the first electronic signature in a storage medium;
    creating, with the escrow verification system, a token in a storage medium and an identification card, wherein the token is an electronically stored signature;
    providing, from the escrow verification system, the identification card to the buyer;
    receiving, at the escrow verification system, a funding confirmation that the buyer has deposited funds into an escrow account for the invoice amount;
    based on the funding confirmation, notifying, from the escrow verification system, the seller to proceed with shipping goods associated with the invoice;
    contracting with a designated shipping company, via the escrow verification system, to provide the shipping of the goods, wherein the designated shipping company is configured to verify a receiver as an authorized signatory;
    receiving, from the seller at the escrow verification system, a shipping confirmation to confirm that the goods have been shipped;
    upon receipt of the goods, authenticating, by the escrow verification system, the receiver as the authorized signatory for the buyer using the verification service to verify the receiver's identity based at least in part on the stored token correlating with the identification card;
    receiving, with the escrow verification system, a second electronic signature from a signatory to be authenticated;
    comparing, with the escrow verification system, the first electronic signature stored in the storage medium with the second electronic signature from the signatory to authenticate the signatory as an agent of the buyer;
    based on receiving an electronic confirmation from the entity responsible for delivery of the goods that the stored token correlates with the identification card and that the signatory is authenticated as the agent of the buyer, releasing, by the escrow verification system, the goods and transferring the deposited funds from the escrow account to the seller's account;

dynamically updating, at the escrow verification system, the centralized view of the invoice interface in response to receiving one or more of funding confirmation, shipping confirmation, or depositing of funds; and thereafter receiving a notification from the buyer, at the escrow verification system, that the authorized signatory is now an unauthorized signatory.

2. The method of claim 1, wherein the token is at least one of a presentation instrument with a magnetic stripe, a random number generator secure identification (ID) device, a radio frequency (RF) identification device, a smart chip device, and a biometric scanning device.

3. The method of claim 1, wherein the authentication of the receiver further comprises comparing the token stored in the storage medium with the provided token.

4. The method of claim 1, wherein the authentication of the receiver further comprises utilizing a selection from a group consisting of:
    an on-line authentication process; and
    an off-line authentication process.

5. The method of claim 4, wherein the on-line verification process comprises:
    presenting the receiver with a login screen;
    receiving, from the receiver, a login name and password; and
    based on the login name and password combination being valid, presenting a verification report verifying the receiver as a valid agent of the buyer.

6. The method of claim 5, wherein the login screen is presented on at least one of a module device, a computer system, a cellular device, and a handheld computing device.

7. The method of claim 4, wherein the offline verification process comprises:
    presenting at least two forms of identification for the receiver, wherein at least one of the forms of identification is associated with the escrow verification system; and
    based on the at least two forms of identification being valid, presenting the shipped goods to the receiver.

8. The method of claim 1, further comprising notifying the seller of the designated shipping company.

9. The method of claim 1, wherein the authorized signatory is a plurality of authorized signatories.

10. The method of claim 1, wherein the invoice is an electronic invoice.

11. A system for facilitating payment of shipped goods, the system comprising:
    at least one escrow verification server configured to:
        initiate an invoicing interface, wherein the invoicing interface is configured to provide a centralized view of a plurality of invoices for a seller;
        forward to a buyer an invoice from the plurality of invoices for a purchase agreement made between the seller and the buyer;
        receive, from the buyer, a service selection indicating that the invoice is to be paid using the escrow verification system;
        receive a first electronic signature input from a digitizing device;
        store the first electronic signature in a storage medium;
        create a token in a storage medium and an identification card, wherein the token is an electronically stored signature;
        provide the identification card to the buyer;
        receive a funding confirmation that the buyer has deposited funds into an escrow account for the invoice amount;
        based on the funding confirmation, notify the seller to proceed with shipping goods associated with the invoice;
        contract with a designated shipping company to provide the shipping of the goods, wherein the designated shipping company is configured to verify a receiver as an authorized signatory;
        receive from the seller, a shipping confirmation to confirm that the goods have been shipped;
        upon receipt of the goods, authenticate the receiver as the authorized signatory for the buyer using the verification service to verify the receiver's identity based at least in part on the stored token correlating with the identification card;
        receive a second electronic signature from a signatory to be authenticated;
        compare the first electronic signature stored in the storage medium with the second electronic signature from the signatory to authenticate the signatory as an agent of the buyer;
        based on receiving an electronic confirmation from the entity responsible for delivery of the goods that the stored token correlates with the identification card and that the signatory is authenticated as the agent of the buyer, release the goods and transferring the deposited funds from the escrow account to the seller's account;
        dynamically update the centralized view of the invoice interface in response to receiving one or more of funding confirmation, shipping confirmation, or depositing of funds; and
        thereafter, receive a notification from the buyer that the authorized signatory is now an unauthorized signatory.

12. A non-transitory machine readable storage medium having processor-executable instructions stored thereon, the instructions executable by one or more processors for:
    initiating an invoicing interface, wherein the invoicing interface is configured to provide a centralized view of a plurality of invoices for a seller;
    forwarding to a buyer an invoice from the plurality of invoices for a purchase agreement made between the seller and the buyer;
    receiving, from the buyer, a service selection indicating that the invoice is to be paid using the escrow verification system;
    receiving a first electronic signature input from a digitizing device;
    storing the first electronic signature in a storage medium;
    creating a token in a storage medium and an identification card, wherein the token is an electronically stored signature;
    providing the identification card to the buyer;
    receiving a funding confirmation that the buyer has deposited funds into an escrow account for the invoice amount;
    based on the funding confirmation, notifying the seller to proceed with shipping goods associated with the invoice;
    contracting with a designated shipping company to provide the shipping of the goods, wherein the designated shipping company is configured to verify a receiver as an authorized signatory;
    receiving from the seller, a shipping confirmation to confirm that the goods have been shipped;
    upon receipt of the goods, authenticating the receiver as the authorized signatory for the buyer using the verification service to verify the receiver's identity based at least in part on the stored token correlating with the identification card;

receiving a second electronic signature from a signatory to be authenticated;

comparing the first electronic signature stored in the storage medium with the second electronic signature from the signatory to authenticate the signatory as an agent of the buyer;

based on receiving an electronic confirmation from the entity responsible for delivery of the goods that the stored token correlates with the identification card and that the signatory is authenticated as the agent of the buyer, releasing the goods and transferring the deposited funds from the escrow account to the seller's account;

dynamically updating the centralized view of the invoice interface in response to receiving one or more of funding confirmation, shipping confirmation, or depositing of funds; and thereafter, receiving a notification from the buyer that the authorized signatory is now an unauthorized signatory.

* * * * *